March 17, 1970  H. MÜELLER  3,501,092
SHUTTER ARRANGEMENT FOR A RECORDING TOTALIZER
Filed Jan. 24, 1968  2 Sheets-Sheet 1
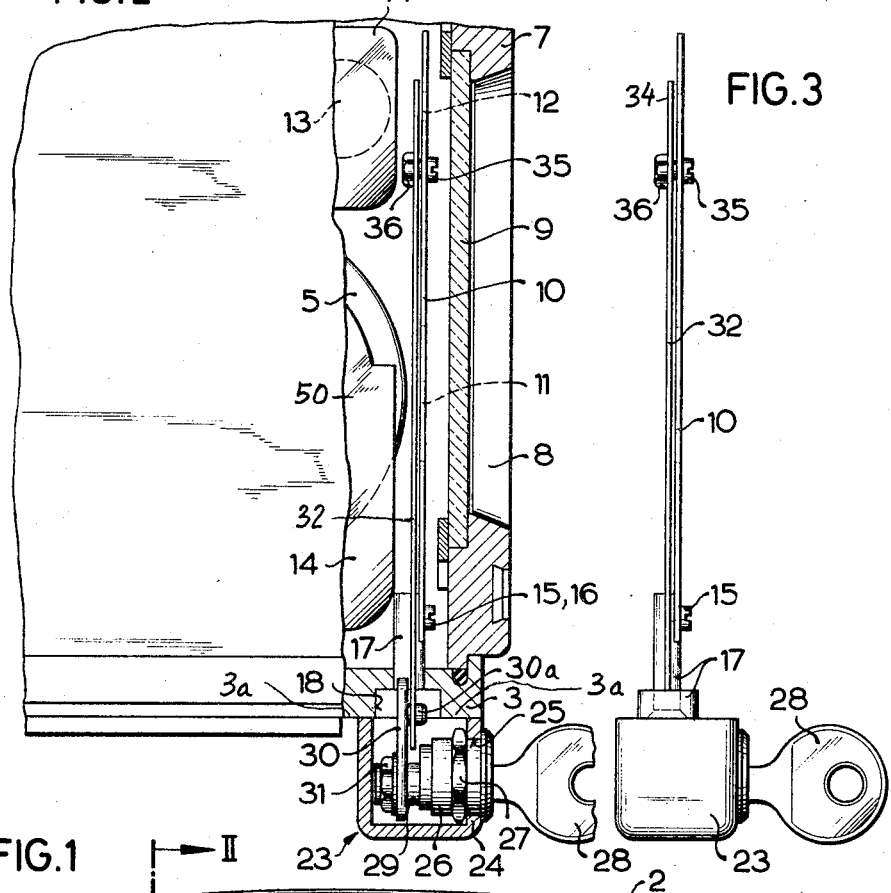
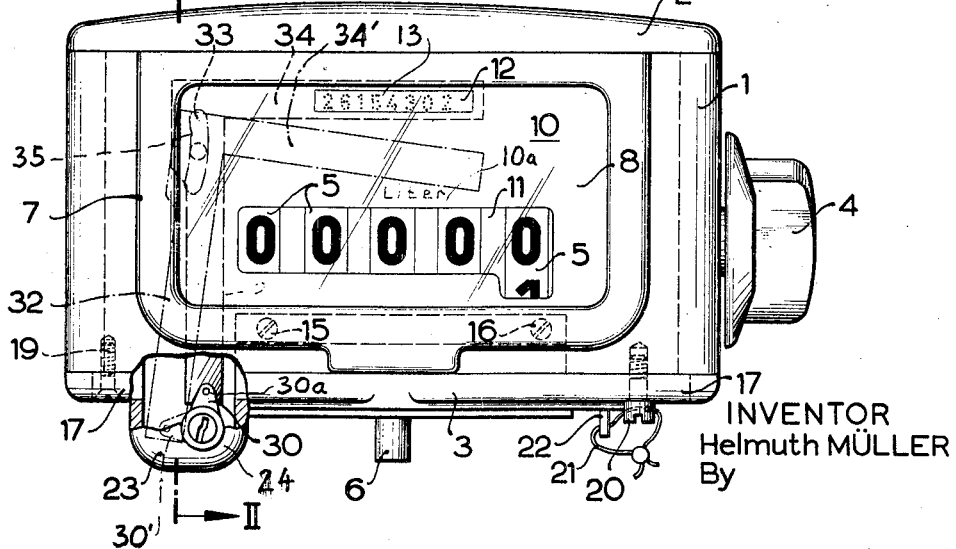
INVENTOR
Helmuth MÜLLER
By
*Michael J. Striker*
his ATTORNEY INVENTOR
HELMUT MÜLLER
By his ATTORNEY

United States Patent Office 3,501,092
Patented Mar. 17, 1970

3,501,092
SHUTTER ARRANGEMENT FOR A RECORDING TOTALIZER
Helmut Müeller, St. Georgen, Black Forest, Germany, assignor to Kienzle Apparate GmbH, Villingen, Black Forest, Germany
Filed Jan. 24, 1968, Ser. No. 700,307
Int. Cl. G06c 5/02; G07b 13/02
U.S. Cl. 235—1        10 Claims

ABSTRACT OF THE DISCLOSURE

An instrument has a closed casing with a window through which indicator means representing information for the public, and the number wheels of a recording totalizer, representing information unsuitable for the public, are arranged. A shutter is locked in a position masking the number of wheels and can be opened only by an authorized person using a key. The carrier wall of the shutter, the lock, and the shutter form a detachable unit.

BACKGROUND OF THE INVENTION

The present invention relates to instruments of the type in which temporary useful information is indicated together with information which is to be permanently retained. For example, tank columns of gas stations have counters provided with number wheels for indicating the amount and price of dispensed liquid fuel to the customer, and such counters are cleared after each sale. On the other hand, a permanent record is to be established of the total volume of fuel which has been sold or of the total amount of money received for all the sold gasoline, which is accomplished by a recording totalizer which is never cleared but continuously adds all the subtotals of the respective individual sales.

Similarly, standard taximeters are provided with indicators showing the fare due for a specific trip to the user of the taxicab, and being cleared when the customer pays. The same taximeter also has a recording totalizer on which the total amount of money received during a specified time period is registered.

The term "recording" totalizer is used in the present application to describe a totalizer which is continuously operated without clearing of subtotals so that changing information is continuously registered and indicated.

While customers must be informed about each transaction concerning them personally, the grand total registered by the recording totalizer need not be divulged to the public, and in many cases it is undesired to inform the public about the grand total of sales of a commodity represented by the recording totalizer.

In accordance with the prior art, information intended for the public is provided in the form of large digits on large number wheels whose diameter may be about 3", while digits of the number wheels of the recording totalizer are provided on number wheels whose diameter is about ¾" so that they are more difficult to read.

It is also known to mount a recording totalizer in the interior of a closed casing so that its number wheels cannot be observed from the outside, and the casing must be opened for inspection of the total indicated by the recording totalizer.

SUMMARY OF THE INVENTION

It is one object of the invention to prevent customers from reading information concerning the grand total of sales.

Another object of the invention is to cover the number wheels of a recording totalizer by a locked shutter which can only be opened by an authorized person.

Another object of the invention is to provide an instrument with a closed casing having an observation window behind which indicators for the public, and other indicators covered by a locked shutter are located.

Another object of the invention is to provide a compact and inexpensive shutter unit for covering a recording totalizer, which can be operated or removed without opening a closed casing.

With these objects in view, one embodiment of the invention comprises a closed casing having a window, a recording totalizer in the casing having a series of number wheels disposed behind the window; shutter means in the casing mounted for movement between a normal masking position located between the window and the number wheels, and a retracted observation position; and a lock including a movable part connected with the shutter means and adapted to be engaged by a key used by an authorized person.

The shutter is moved by the key from the normal masking position to the retracted position so that the indication of the number wheels of the recording totalizer can be observed, whereupon the key is again operated to return the shutter means to the masking position in which the indication of the recording totalizer cannot be seen by the public.

The instrument is generally provided with clearable indicator means located in the casing behind the window and spaced from the shutter means so that the temporary indications of the indicator means can be observed by the customer, whereupon the indicator means is cleared to be read for the next operation concerning another customer.

For example, the clearable indicator means may indicate the volume of gasoline dispensed to a single customer, or the fare of a trip taken by a customer in a taxicab.

While the recording totalizer and the clearable indicator means are driven simultaneously, the indicator means indicate only temporarily required information, and are cleared from time to time, while the recording totalizer is not cleared and continuously registers the changing information regarding consecutive transactions with different customers.

In the preferred embodiment of the invention, the shutter means is mounted on an inner wall which is provided with cutouts through which a line of digits of the number wheels of the totalizers can be viewed through the window. The shutter means perferably includes a shutter whose shape matches the shape of the corresponding cutout, and an arm operated by a movable part of the lock.

It is advantageous to construct the inner wall, the lock and the shutter means thereon as a unit which can be attached to or removed from the closed casing of the instrument. A lead seal is preferably provided for preventing removal of the unit by an unauthorized person without breaking the seal.

Another embodiment of the invention is applied to a taximeter which has indicator means for the fare cleared after each trip, and totalizers and registers indicating the total of all fares, the number of trips and other information not intended for the passenger. Locked shutter means cover the number wheels, and are opened only by an authorized person having a key to the lock of the shutter means.

The novel features which are considered as characteristic for the invention are set forth in particular in the appended claims. The invention itself, however, both as to its construction and its method of operation, together with additional objects and advantages thereof, will be

BRIEF DESCRIPTION OF THE DRAWINGS

FIG. 1 is a front view illustrating an instrument provided with a shutter arrangement according to the invention;

FIG. 2 is a side view, partially in vertical section, taken on line II—II in FIG. 1;

FIG. 3 is a side view illustrating the mounting of the shutter means in the embodiment of FIGS. 1 and 2;

DESCRIPTION OF THE PREFERRED EMBODIMENT

Figure 5:
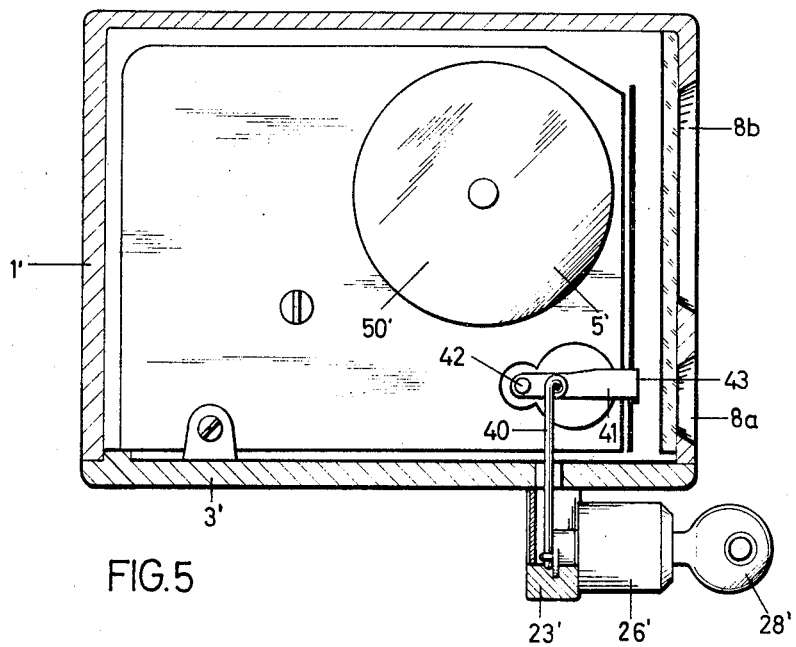
FIG. 5 is a cross sectional view of the embodiment of FIG. 4.

The instrument has a casing constructed of a rectangular box 1 having side walls, a rear wall, and a front wall 7, and closed by a top wall 2 and a bottom wall 3. The front wall 7 has a window 8 covered by a transparent glass plate 9. An inner wall 10 is arranged behind the window 8 and has a small rectangular cutout 12, and a larger cutout 11. Indicator means in the form of number wheels 5 carry indicia representing digits, a line of which is located behind cutout 11. The number wheels 5 are part of a totalizer 50 whose shaft is mounted in the side walls of the casing and which includes clearing means, not shown, by which number wheels 5 can be returned to the illustrated position indicating zero by operation of knob 4.

The smaller number wheels 13 of a recording totalizer 14 also carry digit indicia, a line of which is located opposite and behind cutout 12 in the inner carrier wall 10 whose front face carries a legend 10a indicating the measured unit, for example, liter. A shaft 6 projects out of the housing, and is connected by gear means, not shown, to the totalizers 50 and 14 for simultaneously driving the same. However, the clearing means, not shown, of totalizer 50 are operable to clear the same after each transaction. For example, if a certain number of liters or gallons of gasoline has been discharged at a tank station, the dispensed gasoline has driven shaft 6 and thereby totalizers 50 and 14, and at the end of the transaction, totalizer 50 is cleared, but totalizer 14 is not cleared so that the grand total of all dispensed gasoline is recorded in the form of an indication of the number wheels 13, while the number wheels 5 of totalizer 50 indicate a volume only during the dispensing of gasoline, and indicate zero before and after the transaction. The specific clearing means of totalizer 50 are of a conventional construction and well known to those skilled in the art, and consequently not illustrated, except for the knob 4 which is operated for returning the number wheels 5 to the illustrated position indicating zero. The indicia carrying inner carrier wall 10 is secured by screws 15 and 16 to a closure member 17 which is slidingly mounted in a guide slot 18 extending over the entire width of bottom plate 3 and is secured to the same by screws 19 and 20. Consequently, inner wall 10 can be removed from the housing by removing closure member 17 from guide slot 18 after removal of screws 19 and 20. In order to permit only an authorized person to carry out this operation, screw 20 is sealed by a lead wire seal 21 which passes through a bore in the head of screw 20 and a bore in a fixed member 22 secured to the bottom wall 3 of the casing so that inner wall 10 with closure member 17 cannot be removed without breaking the seal.

Closure member 17 carries a small housing 23 which slidingly abuts bottom faces 3a of bottom wall 3 disposed on opposite sides of guide slot 18. The front wall 24 of housing 23 has an opening 25, and carries a standard safety lock 26 which has a stationary part whose neck portion is located in opening 25, while a flange thereof abuts the front wall 24 due to the pressure produced by a threaded nut 27. In the stationary part of the lock, a movable part 29 is mounted, a portion of which is located on the outside of housing wall 24 and has a slot for the insertion of a key 28. When key 28 is turned, the movable lock part 29 turns together with an arm 30 which is secured to the same by a nut 31. Arm 30 projects into guide slot 18 and carries a pivot 30a by which arm 30 is articulated to an angular shutter means including a vertical arm 32 and a horizontal shutter 34.

Shutter means 32, 34 is mounted on a pivot screw 35 passing through a bore in the inner carrier wall 10 and through an elongated slot 33 in arm 32. A nut 36 is threaded onto an end portion of screw 35, and is spaced from the head portion of screw 35 so that arm 32 and shutter 34 can freely turn and also move in substantially vertical direction when the inner part 29 of lock 29, 25 is turned by key 28.

In one angular position of the key 28 and turnable lock part 29, arm 30 in the position illustrated in solid lines, so that arm 32 and shutter 34 are held in the position illustrated in broken lines in which the shutter 34 covers cutout 12, and thereby the line of digits of the number wheels 13 is located behind cutout 12 in inner wall 10.

When key 28 is turned to its other position, arm 30 assumes a substantially horizontal position 30′ indicated in dash and dot lines, and moves the shutter means downwards which is made possible by slot 33, while the shutter means simultaneously turns about pivot screw 35 so that shutter 34 in the position 34′ is spaced from cutout 12 and the line of digits on number wheels 13 of recording totalizer 14, permitting the person using the key to inspect the indication of the recording totalizer 14 which represents the total volume discharged by a great number of fuel dispensing operations which were individually indicated by the number wheels 5.

It will be seen that inspection of the total of dispensed liquid can be carried out only by a person having a key to the lock 27, 29 while during normal operation of the instrument, the customers cannot find out the total amount of gasoline dispsensed by the respective pump.

Since the shutter means 32, 34 is mounted on the inner carirer wall 10 which is secured by screws 15 and 16 to the closure member 17, an authorized person can break the seal 21, remove screws 19 and 20, and detach the entire unit including inner carrier wall 10, closure member 17, lock housing 23, lock 27, 29, and shutter means 32, 34 which is mounted on inner carrier wall 10. This is possible due to the fact that closure member 17 is slidingly mounted in guide slot 18 and can be downward removed from the same. The unit can be returned in the same manner so that closure member 17 again closes slot 18.

This construction has the advantage that it is only necessary to exchange the bottom plate of an existent instrument casing for a bottom plate having the guide slot 18, whereupon a standard shutter unit can be inserted into the guide slot and thus used with a previously manufactured instrument.

Figure 4:
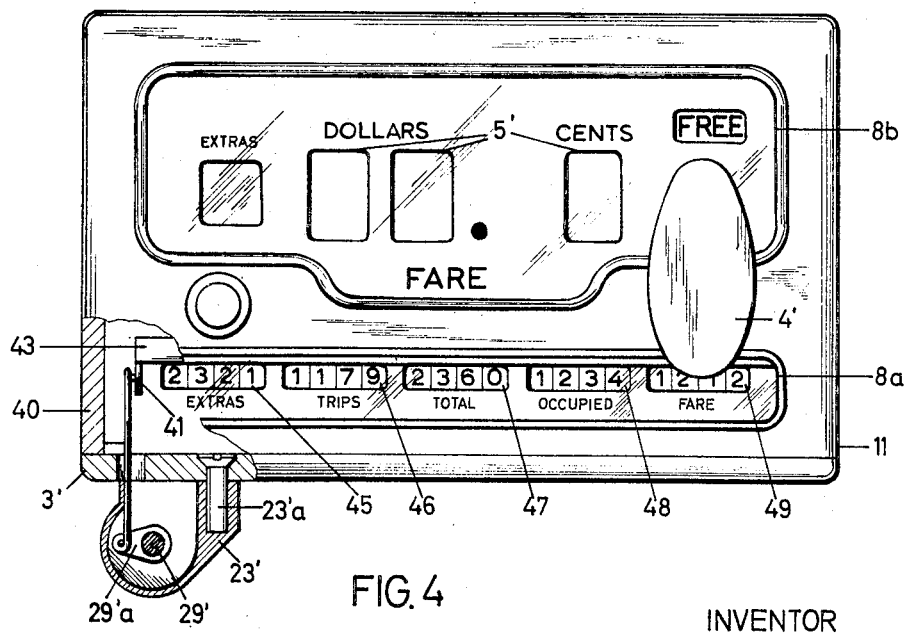
FIG. 4 is a front view partially in section, illustrating a taximeter provided with a shutter arrangement according to the invention.

In the embodiment of FIGS. 4 and 5, a lock housing 23′ is secured to the bottom wall 3′ of casing 1′ by screws 23′a which are accessible only from the interior of the closed casing 1′. A lock 26′ is secured to lock housing 23′ and has a key-operated turnable part ending in a shaft 29′ which carries a fixed arm 29′a pivotally connected by a link 40 to one arm of a pair of arms 41 which are mounted for turning movement about a shaft 42 and carry a shutter 43 located in front of the indicator wheels of totalizers 45–46 indicating totalized values of various items, such as total of fares, total of extras, and total of the time during which the taxi cab was occupied. These indications are visible through a window 8a only when the shutter 43 is lifted by operation of key 28′.

The fare indicated by indicator means 5' of counter 50' behind window 8b is visible at all times to the passenger. After completion of a trip, indicator means 5' are cleared by operation of member 4'.

It will be understood that each of the elements described above, or two or more together, may also find a useful application in other types of shutters for covering indicator means in an instrument casing differing from the types described above.

While the invention has been illustrated and described as embodied in a locked shutter for covering the indication of a totalizer so that only an authorized person having a key can read the indication, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omittting features that, from the standpoint of prior art, fairly constitute essential characeristics of the generic or specific aspects of this invention.

What is claimed as new and desired to be protected by Letters Patent is set forth in the appended claims.

1. Shutter arrangement for a recording totalizer, comprising, in combination, a casing having a front wall including window means, and being formed with an opening; a recording totalizer mounted in said casing and having a series of indicator elements disposed behind said window means; and a shutter unit including a closure means located in said opening, carrier means located in said casing and secured to said closure means, shutter means mounted on said carrier means for movement between a normal masking position located between said indicator elements and said window means, and a retracted observation position in which said indicator elements can be viewed through said window means, lock means secured to said closure means and having a movable part including a portion located outside of said casing and adapted to be operated by a key, linkage means connecting said movable part with said shutter means so that by operation of said key said shutter means is moved between said positions of the same, and attaching means for detachably attaching said closure means to said casing; said carrier means, said shutter means, and said linkage means being located in a position registering with said opening in one direction and having an outline smaller than the outline of said opening in a plane transverse to said one direction so that when said closure means is detached from said casing, said shutter unit can be removed as a whole from said casing in said one direction.

2. Shutter arrangement as claimed in claim 1 and comprising a sealing means connected with said attaching means and said casing and adapted to be broken by removal of said shutter unit from said casing.

3. Shutter arrangement as claimed in claim 1 wherein said unit includes a lock housing enveloping said lock means and secured to said closure means, said lock housing having an opening for said portion of said movable part of said lock means.

4. Shutter arrangement as claimed in claim 1 comprising clearable indicator means located in said casing means behind said window means and spaced from said shutter means for continuous observation through said window means.

5. Shutter arrangement as claimed in claim 4 and comprising means for driving said recording totalizer and said indicator means so that said indicator elements of said recording totalizer indicate a grand total, and said indicator means indicate temporarily required information and are adapted to be cleared from time to time.

6. Shutter arrangement as claimed in claim 1 wherein said shutter means includes an elongated shutter located opposite a line of digits on said indicator elements, and an arm secured to said shutter; and wherein said movable part of said lock means includes a pivot connected with said arm.

7. Shutter arrangement as claimed in claim 1 wherein said carrier means includes an inner wall carrying indicia and located behind said front wall and forwardly of said recording totalizer, said inner wall having an elongated cutout opposite a line of digits on said indicator elements and behind said window means; and wherein said shutter means is mounted on said inner wall for movement between said positions thereof and includes a shutter for covering said cutout and located between said inner wall and said number wheels.

8. Shutter arrangement for a recording totalizer, comprising, in combination, closed casing means including a front wall having window means, and a bottom wall formed with a guide slot; a recording totalizer mounted in said casing means and having a series of number wheels disposed behind said window means; an inner wall carrying indicia and located behind said front wall forwardly of said recording totalizer, said inner wall having an elongated cutout opposit a line of digits of said number wheels and behind said window means, and including a member located in said slot; shutter means mounted in said casing means on said inner wall for movement between a normal masking position located between said window means and said number wheels, and a retracted observation position in which said number wheels can be viewed through said window means, and including a shutter for covering said cutout and located between said inner wall and said number wheels; and lock means supported on said member of said inner wall and including a movable part connected with said shutter means, and having a portion located outside of said casing means and adapted to be engaged by a key so that said movable part can be operated by said key for moving said shutter means between said positions of the same, said member of said inner wall supporting said lock means and being slidable in said slot so that said member and said inner wall can be removed from said casing means together with said lock means and shutter means.

9. Shutter arrangement as claimed in claim 8 including a lock housing secured to said member and enveloping said lock means, said lock housing having an opening for said portion of said movable part of said lock means.

10. Shutter arrangement as claimed in claim 9 wherein said member, said inner wall, said shutter means, said lock means, and said lock housing together form a shutter unit detachable from said casing means by sliding said member in said guide slot, and including screw means for securing said member to said bottom wall; and a lead seal securing said screw means and adapted to be destroyed when said screw means are removed for detachment of said shutter unit.

References Cited

UNITED STATES PATENTS

| 1,596,566 | 8/1926 | Wheeler | 235—1 X |
| 1,717,687 | 6/1929 | Howard | 235—1 X |
| 1,814,663 | 7/1931 | Bond | 235— 1 X |
| 2,411,273 | 11/1946 | Kennedy et al. | 235—1 |
| 2,573,083 | 10/1951 | Wolfe | 235—1 |

FOREIGN PATENTS

| 49,538 | 8/1911 | Austria. |
| 1,191,598 | 4/1959 | France. |

RICHARD B. WILKINSON, Primary Examiner

STANLEY A. WAL, Assistant Examiner

U.S. Cl. X.R.

235—30